US009818553B2

(12) United States Patent
Hallet

(10) Patent No.: US 9,818,553 B2
(45) Date of Patent: Nov. 14, 2017

(54) ELECTRIC SWITCH WITH RUBBING CONTACT

(71) Applicant: SC2N, Creteil (FR)

(72) Inventor: Michel Hallet, Clinchamps sur Orne (FR)

(*) Notice: Subject to any disclaimer, the term of this patent is extended or adjusted under 35 U.S.C. 154(b) by 104 days.

(21) Appl. No.: 14/359,415

(22) PCT Filed: Nov. 20, 2012

(86) PCT No.: PCT/FR2012/000477
§ 371 (c)(1),
(2) Date: May 20, 2014

(87) PCT Pub. No.: WO2013/076387
PCT Pub. Date: May 30, 2013

(65) Prior Publication Data

US 2014/0291129 A1 Oct. 2, 2014

(30) Foreign Application Priority Data

Nov. 21, 2011 (FR) ..................................... 11 03537

(51) Int. Cl.
*H01H 1/40* (2006.01)
*H01H 1/36* (2006.01)
(Continued)

(52) U.S. Cl.
CPC .............. *H01H 1/36* (2013.01); *H01H 1/023* (2013.01); *H01H 1/025* (2013.01); *H01H 1/04* (2013.01);
(Continued)

(58) Field of Classification Search
CPC ...... H01H 19/58; H01H 19/11; H01H 1/2041; H01H 25/06; H01H 19/56
(Continued)

(56) References Cited

U.S. PATENT DOCUMENTS 5,156,756 A 10/1992 Kojima et al.
5,405,543 A 4/1995 Otake et al.
(Continued)

FOREIGN PATENT DOCUMENTS

EP 0 612 085 A2 8/1994
EP 1 915 039 A2 4/2008
(Continued)

OTHER PUBLICATIONS

International Search Report for corresponding International Application No. PCT/FR2012/000477, dated Mar. 20, 2013 (2 pages).
(Continued)

*Primary Examiner* — Edwin A. Leon
*Assistant Examiner* — Ahmed Saeed
(74) *Attorney, Agent, or Firm* — Osha Liang LLP

(57) ABSTRACT

The present invention relates to an electric switch with rubbing contact (3) comprising on the one hand at least one fixed contact (9) and on the other hand at least one moving rubbing contact (3) that can move along a predefined trajectory and exhibiting a contact surface (10) intended to rub on said at least one fixed contact (9), characterized in that at least said contact surface (10) is treated by ion bombardment by virtue of an ion beam, and in that the fixed (9) and moving (3) contacts are bare.

11 Claims, 3 Drawing Sheets

Figure 3:
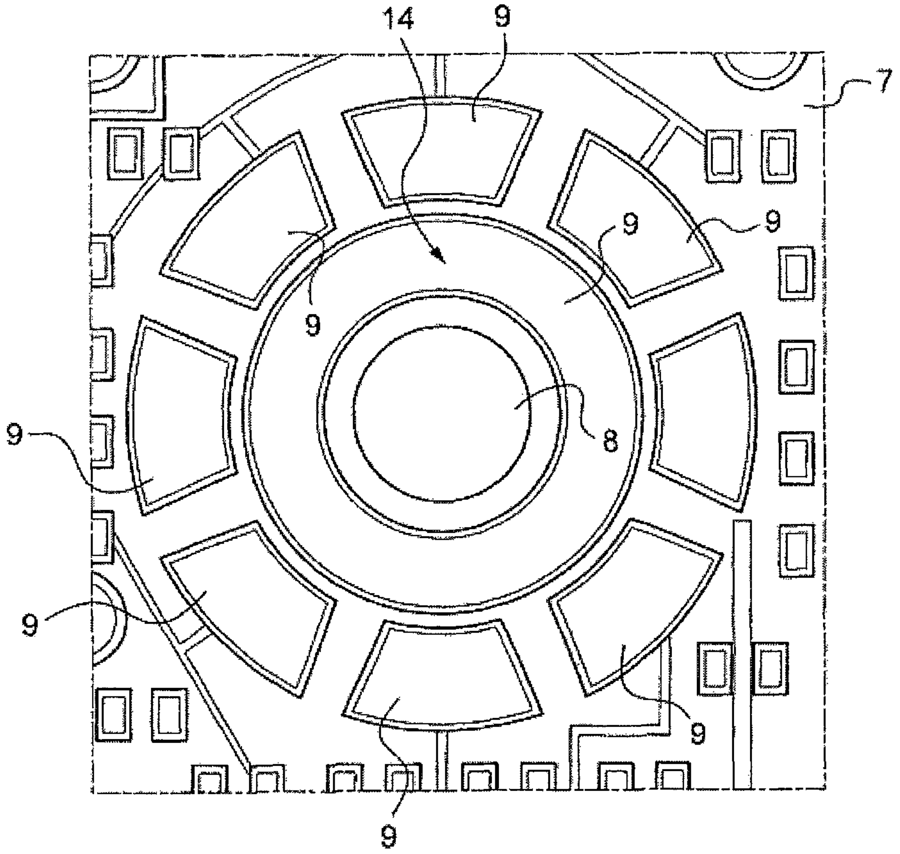

(51) Int. Cl.

| | |
|---|---|
| ***H01H 1/023*** | (2006.01) |
| ***H01H 1/025*** | (2006.01) |
| ***H01H 1/04*** | (2006.01) |
| ***H01H 1/60*** | (2006.01) |
| ***H01H 19/58*** | (2006.01) |

(52) U.S. Cl.
CPC .............. *H01H 1/403* (2013.01); *H01H 1/60* (2013.01); *H01H 19/585* (2013.01); *H01H 1/40* (2013.01)

(58) Field of Classification Search
USPC ....... 200/61.54, 11, 18, 571, 570, 11 R, 564, 200/336
See application file for complete search history.

(56) References Cited

U.S. PATENT DOCUMENTS

| | | | | |
|---|---|---|---|---|
| 6,538,254 | B1 * | 3/2003 | Tomimatsu ......... | H01J 37/3056 250/442.11 |
| 6,674,183 | B1 * | 1/2004 | Noda ..................... | H01H 19/58 200/571 |
| 7,087,848 | B1 * | 8/2006 | Yamasaki .............. | B60K 37/06 200/18 |
| 7,297,883 | B2 * | 11/2007 | Rochon .................. | H01H 25/06 200/5 R |
| 2005/0252751 | A1 * | 11/2005 | Holt ..................... | H01H 27/002 200/11 R |
| 2011/0117383 | A1 | 5/2011 | Asada et al. | |

FOREIGN PATENT DOCUMENTS

| | | | | |
|---|---|---|---|---|
| EP | 2 216 796 | A1 | 8/2010 | |
| FR | 2939973 | * | 12/2008 | ............. H01R 13/03 |
| FR | 2 933 530 | A1 | 1/2010 | |
| FR | 2 939 973 | A1 | 6/2010 | |
| GB | 2 297 867 | A | 8/1996 | |
| JP | 3-117191 | A | 5/1991 | |
| JP | 4-114098 | A | 4/1992 | |

OTHER PUBLICATIONS

"Electrical contact lubrication;" RS Data Sheet K 232-4033; issued Mar. 1997; pp. 1-4 (4 pages).

* cited by examiner

Fig.1a
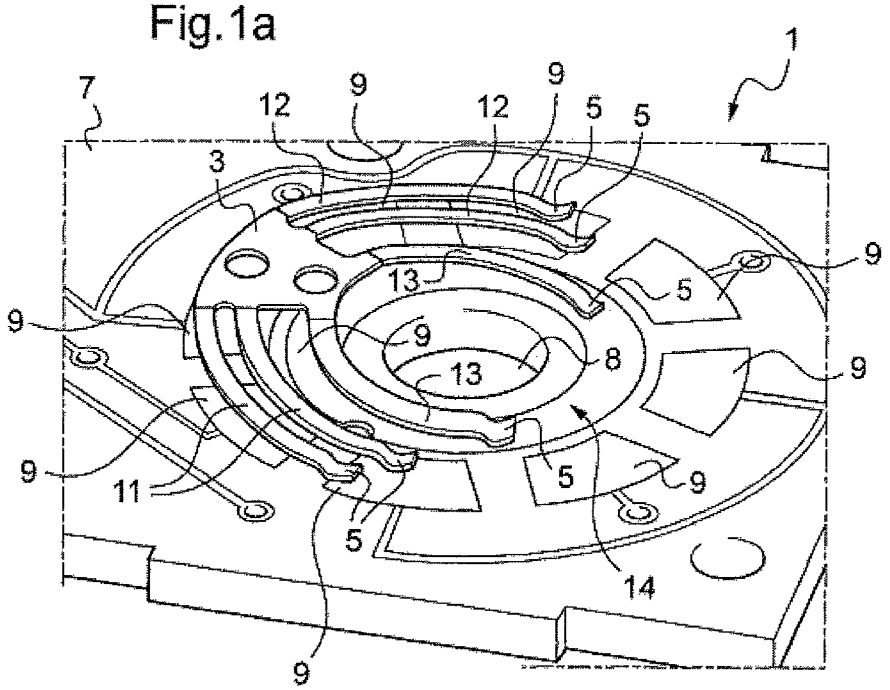
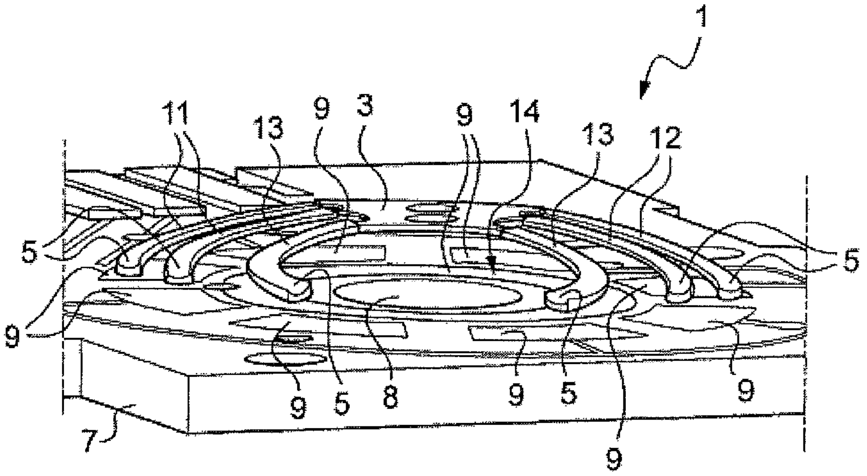
Fig.1b

Fig.2a
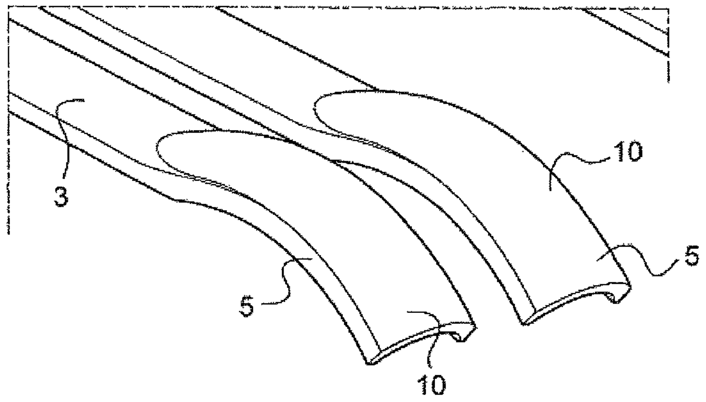
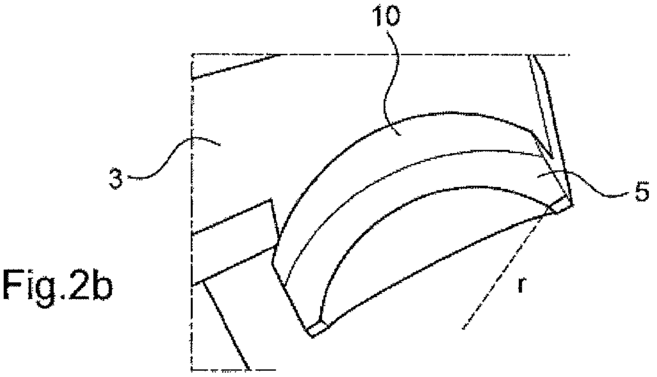
Fig.2b
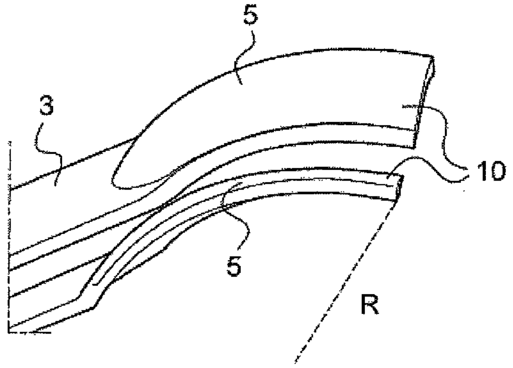
Fig.2c

ELECTRIC SWITCH WITH RUBBING CONTACT

The present invention relates to an electrical switch with rubbing contact, in particular for steering wheel control modules or motorized windscreen wiper blade drive systems.

In the motor vehicle, electrical switches with rubbing or sliding contact are widely used.

They generally consist of one or more conductive tracks located on a PCB circuit and of a wiper contact or carriage which moves along a predefined trajectory on the PCB to make, in certain positions, an electrical contact making it possible to produce a command, such as, for example, to switch on the vehicle headlights or for the windscreen wiper controls. As an example, FR 2 933 530 in the name of the applicant can be cited.

The quality standards for these rubbing contacts are very high, given that it is essential to ensure the correct operation of these rubbing contacts throughout the life of the vehicle, that is to say up to 10 to 15 years, in difficult operating conditions. They may, for example, be rubbing contacts for high current (for example of a few amperes) which are used these days in inexpensive vehicles for directly controlling the windscreen wiper motor or the headlights, or rubbing contacts for low current (for example of a few mA) which will, for example, control a power relay linked to the windscreen wiper motor or to the headlights.

In practice, these rubbing contacts are subject to significant temperature variations that can range from −40° C. to +120° C. Dust can be deposited on the conductive track of the PCB and prevent operation, that is to say the making of the electrical contact. Given that the vehicle can be parked anywhere, it can be subject to conditions of humidity, even salty humidity, which can consequently cause oxidation problems. In this case, the layer of oxide which is electrically insulating prevents the making of an electrical contact. Furthermore, depending on the surface quality of the rubbing contact and of the conductive track, the contact resistance can vary and, in addition, there may also be problems of abrasion of metal parts which can, in the long term and by accumulation, result in false electrical contacts and thus cause the steering wheel control module to malfunction. In the case of the rubbing contacts for high current there are also the added problems of the formation of an electrical arc which can damage the electrical contact surfaces.

These problems are, for example, explained in detail in a DATA SHEET K 232-4033 dated March 1997 from the company RS Components.

To overcome these problems, the use of a specific lubricant, of contact grease, is required of all the players in the sector, because it makes it possible to reduce the abrasion effects, protect the surfaces from contaminations, prevent the corrosion of the rubbing contacts and of the conductive tracks and prevent the formation of electrical arcs.

This lubricant has been, and is still, the subject of much research, particularly at the request of the manufacturers of circuits with rubbing contacts or the manufacturers of steering wheel control modules, etc.

As evidence of this research activity, a certain number of documents can be cited.

Thus, JP030117191 and JP04114098, U.S. Pat. No. 5,156,756, U.S. Pat. No. 5,405,543, published respectively in 1991, 1992 (twice) and 1995 in the name of a manufacturer of steering wheel control modules describes a lubricant for rubbing contact that makes it possible to reduce the contact resistance and that does not produce a carbonized substance.

In 1999, in the IEIC technical report journal, an article "Required performance/characteristics and evaluation method for electric contact grease" was published (vol. 99, N° 360, pages 39-43).

In 2001, in this same journal (vol. 101, N° 375, pages 7-11), an article entitled "The reliability of sliding contact. Effect of grease" was published.

Even more recently, rubbing contacts associated with contact grease have been the subject of patent applications such as, for example, EP2 216 796 published in 2010 in the name of another manufacturer of steering wheel control modules.

And again in 2011, the application US2011/0117383 describes how, for rubbing electrical contacts, grease is essential to ensure the correct operation of the rubbing electrical contacts.

Indeed, the application FR 2 933 530 published in 2010 discloses a coating formed by an ink based on carbon and polymers which would make it possible to dispense with the grease, but tests have shown that these coatings have not been able to give full satisfaction, and in particular, its application does not meet the standards required for the safety functions, such as, for example, control of the lights, windscreen wipers, etc. In practice, the contact resistances are much higher due to the resins mixed with the carbon. Furthermore, the wear resistance is much worse and particles can become stuck between the tracks, thus causing short circuits.

Particularly for the safety functions there are therefore no alternatives to the conventional solutions with contact grease as described above.

To sum up, it can therefore be concluded that, for the community of rubbing electrical contact manufacturers, the use of grease is essential to ensure correct operation over time of the rubbing electrical contacts, and do so despite the cost overhead problems brought about by the grease during manufacture both in terms of material cost and in terms of additional assembly time induced by the greasing.

In 1997, in the Journal de Physique IV (J. PHYS. IV France 7 (1997)—Symposium C6, Supplement to the Journal de Physique III of December 1997), an article entitled "Modification et caractérisation des surfaces par bombardement ionique" (Modification and characterization of surfaces by ion bombardment) was published.

This article tells the story of surface modifications by ion bombardment, the effects obtained and the potential applications.

Thus, it will be understood that this technique has already been known for a long time and much work has been carried out with a view to improving tribological properties (microhardness; wear; friction) and resistance to corrosion, and to oxidation for metal surfaces.

More particularly, regarding the tribology of the metal surfaces, it is observed in this article that "the formation of a hardened layer on the surface of a metal by ion implantation has become common currency in tribology. Most of this work relates to the formation of nitrides of the steels or of the titanium alloys, in order to make them more wear resistant".

However, this article is also critical by stating that "among the drawbacks, the initial investment cost can be cited" and "there is every right to wonder if ion implantation will always remain an academic tool, dedicated solely to fundamental research".

More recently, FR2 939 973 discloses a method for manufacturing a connector element comprising a substrate on which a layer of gold is deposited.

In this document, the connector described is a connector of the male-female kind in which the electrical contact comprises a layer of gold treated by ion bombardment.

However, this document does not describe any rubbing contact as known from the steering wheel control modules or the problem associated therewith, in particular the problems due to the movements of the rubbing electrical contact on the conductive track. In practice, a male-female connector is not at all subject to the same mechanical movement stresses as a rubbing contact.

The present invention therefore proposes an electrical switch with rubbing contact that is improved compared to the prior art.

To this end, the subject of the present invention is an electrical switch with rubbing contact comprising, on the one hand, at least one fixed contact and, on the other hand, at least one moving rubbing contact that moves along a predefined trajectory and has a contact surface intended to rub on said at least one fixed contact, characterized in that at least said contact surface is treated by ion bombardment by an ion beam, and in that the fixed and moving contacts are bare.

The result thereof is that the electrical switch has no lubricant, that is to say no contact grease, which is a significant improvement on the known electrical switches and offers a considerable advantage in terms of cost and assembly time of the switches without in any way compromising the dependability in terms of operating cycles, wear, contact resistance, robustness against contaminations or oxidation.

Despite the fact that the ion bombardment was known per se, and as is proven by the recent patent publications regarding electrical switches, a person skilled in the art has continued to consider contact grease to be essential to operation.

Even the document FR2 939 973, although published two years before US2011/0117383, but which relates only to male-female plug type connectors whose operation differs from switches with rubbing moving contact, has not changed the perception of those skilled in the art regarding the need to use a contact grease for an electrical switch with rubbing moving contact.

Through the present invention, the applicant has therefore overcome a prejudice that is widely anchored in the technological field of electrical switches with rubbing moving contact.

Furthermore, the environmental impact of an electrical switch according to the invention is greatly reduced.

Moreover, the electrical switch can also exhibit one or more of the following features, taken alone or in combination:

- said at least one fixed contact is free of contact grease;
- all of the fixed and moving contacts are treated by ion bombardment by an ion beam, at least on the surfaces that can make electrical contact;
- the moving rubbing contact is made of steel, copper, stainless steel, bronze, brass, aluminum or an aluminum alloy;
- said contact surface of the rubbing moving contact comprises a nickel plating on the substrate forming the rubbing moving contact and a noble metal plating on the nickel plating;
- said contact surface of the rubbing moving contact comprises a noble metal plating on the substrate forming the rubbing moving contact;
- the thickness of the noble metal plating is between 0.25 μm and 1 μm;
- said contact surface intended to rub on said at least one fixed contact has a curved surface having a first radius of curvature of between 0.5 mm and 5 mm in the direction of movement of the rubbing moving contact and a second radius of curvature of between 0.5 mm and 2 mm in the direction perpendicular to the movement of the rubbing moving contact;
- the fixed and moving contacts are dimensioned to convey a high current, notably greater than 1 A;
- the fixed and moving contacts are dimensioned to convey a low current, notably less than 20 mA;
- for the treatment by ion bombardment, ions of the atoms of the group consisting of noble gases, nitrogen or boron atoms are chosen.

The invention relates also to a steering wheel control module for a motor vehicle, characterized in that it comprises an electrical switch as defined above, the moving rubbing contact of which is linked to a control lever, notably controlling the headlights or windscreen wipers.

The invention relates further to a motorized drive system for a windscreen wiper blade of a motor vehicle comprising a windscreen wiper blade drive motor and an electrical switch as defined above for controlling the back and forth motion of the wipers.

Other features and advantages of the invention will emerge from the following description, given as a nonlimiting example, in light of the attached drawings in which:

FIGS. 1*a* and 1*b* are plan views of an electrical switch with rubbing contact according to the invention, FIGS. 2*a* and 2*b* are side and front views of ends of a moving rubbing contact, FIG. 2*c* is a cross-sectional view of an end of FIG. 2*a*, and FIG. 3 is a plan view of a fixed contact support of the electrical switch with rubbing contact.

In these figures, identical elements bear the same reference numbers.

FIGS. 1*a*, 1*b* and 3 illustrate an exemplary embodiment of an electrical switch with rubbing contact 1.

Such an electrical switch 1 can, for example, be incorporated in a steering wheel control module for a motor vehicle, particularly to perform the electrical switch of safety functions such as, for example, control of the lights, of the windscreen wipers, etc., or else in a motorized windscreen wiper blade drive system for controlling the back and forth motion of the wipers.

The figures show an electrical switch for low current, that is to say for conveying a current less than 20 mA.

As an alternative, the invention can be transposed to an electrical switch for high current, that is say greater than 1 A, which is distinguished from a low current switch in particular by the increased cross section of the conductors so as to be able to convey this high current.

This electrical switch 1 comprises, on the one hand, at least one, in FIG. 1*a* several, fixed contacts 9 arranged on a support 7. The support 7 is, for example, a printed circuit board and the fixed contacts 9 are contact lands.

Electrical tracks of this printed circuit board link the fixed contacts 9 to an electrical control circuit.

FIGS. 1 to 3 show a support 7 having a pierced center 8 so as to allow the passage of a lever and electrical wires for a steering wheel control stalk.

As illustrated in FIGS. 1 to 3, the fixed contacts 9 are arranged in a circle on the support 7.

It can thus be seen, in FIG. 3, that the support 7 comprises eight fixed contacts 9 in the form of circular arc strips.

The fixed contacts 9 thus define four different switching states of the electrical switch 1, given that, for dependability reasons, the fixed contacts 9 are duplicated in this example.

An additional fixed contact 14 is also provided, in the form of a ring, and linked to a power supply or to the ground.

This additional fixed contact 14 is, for example, arranged concentrically to the circle formed by the fixed contacts 9.

Also, the electrical switch 1 comprises at least one moving rubbing contact 3 that can move along a predefined trajectory; in this case a circular arc trajectory is able to bring it into contact with one or more of the fixed contacts 9. This trajectory is at least partially parallel to the plane defined by the support 7, that is to say the printed circuit board. According to the example shown in FIGS. 1*a* and 1*b*, the subject is a rotary switch and the moving rubbing contact 3 can therefore describe a rotational movement.

According to a variant that is not represented, the moving rubbing contact can be produced in the form of a carriage moving along a straight-line trajectory so as to be able to make contact with fixed contacts arranged in a line.

The moving rubbing contact 3 is, for example, linked to a control lever, notably for controlling the headlights or windscreen wipers. Thus, by the movement exerted by a user on the control lever, the moving rubbing contact 3 is moved along the predefined trajectory.

The switch 1 can thus make an electrical contact for one or more predefined positions of the moving rubbing contact 3 with at least one corresponding fixed contact 9 borne by the support 7.

As can be seen in FIGS. 1*a* and 1*b*, the moving rubbing contact 3 takes the form of a fork that has at least two, here three, branches 11, 12, 13, advantageously flexible, mounted on a moving base.

The moving base also comprises means for fixing to a control element of the device (not represented).

The branches 11, 12 are able to make two simultaneous electrical contacts with two corresponding fixed contact 9 and are duplicated to improve the dependability.

The branch 13 is in rubbing contact with the additional fixed contact 14.

The rubbing contact 3 comprises, on each branch 11, 12, 13, a curved end 5 stressed toward said support 7, Thus, depending on its angular position, the domed part of the curved end 5 makes frictional contact with the corresponding fixed contact 9, to make an electrical contact. The end 5 of each branch therefore forms a contact surface 10 intended to rub on said at least one fixed contact 9.

At least this portion of the end 5 of each branch intended to rub on a fixed contact 9 is treated by ion bombardment by an ion beam.

This treatment by ion bombardment confers on this treated portion a better surface condition reducing friction. Furthermore, this better surface condition prevents the contamination of the rubbing moving contact, for example by silicone.

Furthermore, this treatment makes it possible to prevent the risks of oxidation which makes it possible to keep the contact resistance at an acceptable level throughout the life of the switch.

Furthermore, the fixed 9 and moving 3 contacts are bare, that is to say free of any lubricant, such as, for example, contact grease.

Thus, during the assembly procedure, there is no longer a need to provide a tedious contact grease application step. The elimination of the greasing step makes the switch less of a pollutant to the environment.

According to one development, both the fixed 9 and moving rubbing 3 contacts are treated by ion bombardment by an ion beam. It may be a local treatment only on the surfaces which make contact, or it is also possible to consider a treatment of the fixed and moving rubbing contacts as a whole.

The moving rubbing contact 3 can be made of steel, copper, stainless steel, bronze, brass, aluminum or an aluminum alloy.

The reader's attention is notably drawn to moving rubbing contacts made of steel or stainless steel which are less expensive than contacts made of copper, bronze or brass. In practice, the ion bombardment makes it possible to reduce, even eliminate, the formation of an insulating oxide layer on the moving contact, such that a nickel plating is no longer necessary. In this case, it is envisaged that the substrate of the moving rubbing contact is subject as a whole to the ion bombardment by an ion beam.

For the treatment by ion bombardment of all the embodiments, ions of the atoms of the group made up of noble gases (notably He, Ne, Ar, Kr, Xe), nitrogen or boron atoms are, for example, chosen.

According to a variant, the contact surface 10 of the rubbing moving contact 3 comprises a nickel plating on the substrate forming the rubbing moving contact 3 and a plating of a noble metal, such as gold or silver, on the nickel plating. The ion bombardment in this case takes place after the deposition of the noble metal plating.

According to another variant, said contact surface 10 of the rubbing moving contact 3 comprises only a plating of a noble metal, such as gold or silver, on the substrate forming the rubbing moving contact. This variant also has the advantage of eliminating the nickel plating which is necessary in the prior art to be able to make the noble metal adhere to the substrate, notably made of copper or brass. Therefore, in addition to the elimination of the contact grease, it is possible to dispense with the nickel which also makes it possible to make the switch less of a pollutant for the environment, both in its manufacture and at the end of life. Furthermore, the elimination of the nickel plating also makes it possible to eliminate a step in the manufacturing of the switch and reduce the cost of the electrical switch. In fact, the effect of the treatment by ion bombardment is not only to improve the surface condition of the electrical contact surface, but also to allow for the adherence of the noble metal to the substrate which is in a non-noble metal, and to do so without involving a plating such as nickel, for example.

For these above two variants, provision is made for the thickness of the noble metal plating (gold or silver) to be between 0.25 μm and 1 μm, which is much less than the hitherto known thicknesses of 2 to 3 μm. With the material cost of the noble metals which has increased very significantly in recent times, the significant reduction of the noble metal thickness and therefore of the quantity of noble metal to be applied also allows for a significant reduction in the cost price of the electrical switch.

According to a third variant, no plating is applied to the electrical contact surface 10. This end is therefore treated only by bombardment by an ion beam. This again makes it possible to reduce the manufacturing cost of the electrical switch while ensuring correct operation throughout the life of the electrical switch, and without contact grease.

The following table summarizes the embodiments considered to be the most advantageous, without in any way being exhaustive. What is common to all these variants is that there is no longer any contact lubricant.

| Embodiment | Substrate | Contact lubricant | Nickel plating | Noble metal plating (example gold, silver) | Treatment by ion bombardment |
|---|---|---|---|---|---|
| 1 | Copper | No | Yes | Yes | Electrical contact surface or the entire substrate |
| 2 | Brass | No | Yes | Yes | Electrical contact surface or the entire substrate |
| 3 | Steel | No | Yes | Yes | All the substrate |
| 4 | Stainless steel | No | Yes | Yes | Electrical contact surface or the entire substrate |
| 5 | Bronze | No | Yes | Yes | Electrical contact surface or the entire substrate |
| 6 | Copper | No | No | Yes | Electrical contact surface or the entire substrate |
| 7 | Brass | No | No | Yes | Electrical contact surface or the entire substrate |
| 8 | Steel | No | No | Yes | The entire substrate |
| 9 | Stainless steel | No | No | Yes | Electrical contact surface or the entire substrate |
| 10 | Bronze | No | No | Yes | Electrical contact surface or the entire substrate |
| 11 | Copper | No | No | No | Electrical contact surface or the entire substrate |
| 12 | Brass | No | No | No | Electrical contact surface or the entire substrate |
| 13 | Steel | No | No | No | The entire substrate |
| 14 | Stainless steel | No | No | No | Electrical contact surface or the entire substrate |
| 15 | Bronze | No | No | No | Electrical contact surface or the entire substrate |
| 16 | Aluminum | No | No | Yes | Electrical contact surface or the entire substrate |
| 17 | Aluminum alloy | No | No | Yes | Electrical contact surface or the entire substrate |
| 18 | Aluminum | No | No | No | Electrical contact surface or the entire substrate |
| 19 | Aluminum alloy | No | No | No | Electrical contact surface or the entire substrate |

As can be seen in the figures, notably 2*a*, 2*b* and 2*c*, the end 5 of the moving rubbing contacts is domed or curved.

The radius of curvature R of the first domed part of the curved end 5 is between 0.5 mm and 5 mm (FIG. 2*c*) in the direction of movement of the rubbing moving contact.

The radius of curvature r of the second domed part of the curved end 5 is between 0.5 and 2 mm (FIG. 2*b*) in the direction perpendicular to the movement of the rubbing moving contact.

It will therefore be understood that it is possible to produce an electrical switch with rubbing moving contact without contact lubricant, even without nickel plating and even also without noble metal which allows for a competitive cost price, a better environmental compatibility while ensuring exemplary dependability.

The invention claimed is:

1. An electrical switch with rubbing contact comprising:

at least one fixed contact disposed on a surface of a support; and at least one moving rubbing contact that moves along a predefined trajectory and has a contact surface that rubs across a surface of said at least one fixed contact during a rotational movement of the electrical switch, wherein at least said contact surface is treated by ion bombardment by an ion beam, and wherein the fixed and moving contacts are bare, wherein the at least one moving rubbing contact is U-shaped and has at least three curved branches, wherein two out of the three curved branches extend out of opposite sides of the at least one moving rubbing contact, and wherein a free terminal end of each of the at least three curved branches is stressed towards the surface of the support.

2. The electrical switch as claimed in claim 1, wherein said at least one fixed contact is free of contact grease.

3. The switch as claimed in claim 1, wherein all of the fixed and moving contacts are treated by ion bombardment by an ion beam, at least on the surfaces that can make electrical contact.

4. The electrical switch as claimed in claim 1, wherein the moving rubbing contact is made of one selected from the group consisting of steel, copper, stainless steel, bronze, brass, aluminum or an aluminum alloy.

5. The electrical switch as claimed in claim 1, wherein said contact surface of the rubbing moving contact comprises a nickel plating on a substrate that forms the rubbing moving contact and a noble metal plating on the nickel plating.

6. The electrical switch as claimed in claim 5, wherein the thickness of the noble metal plating is between 0.25 μm and 1 μm.

7. The electrical switch as claimed in claim 1, wherein said contact surface of the rubbing moving contact comprises a noble metal plating on a substrate that forms the rubbing moving contact.

8. The electrical switch as claimed in claim 1, wherein said contact surface that rubs across the surface of said at least one fixed contact has a curved surface having a first radius of curvature of between 0.5 mm and 5 mm in a direction of movement of the rubbing moving contact and a second radius of curvature of between 0.5 mm and 2 mm in a direction perpendicular to the movement of the rubbing moving contact.

9. The electrical switch as claimed in claim 1, wherein the fixed and moving contacts are dimensioned to convey a high current, notably greater than 1 A.

10. The electrical switch as claimed in claim 1, wherein the fixed and moving contacts are dimensioned to convey a low current, notably less than 20 mA.

11. The electrical switch as claimed in claim 1, wherein, for the treatment by ion bombardment, ions of the atoms of the group consisting of noble gases, nitrogen or boron atoms are chosen.

* * * * *